United States Patent
Chen et al.

(10) Patent No.: US 12,254,262 B2
(45) Date of Patent: Mar. 18, 2025

(54) CALIBRATION METHOD FOR EMULATING GROUP III-V SEMICONDUCTOR DEVICE AND METHOD FOR MANUFACTURING GROUP III-V SEMICONDUCTOR DEVICE

(71) Applicant: TAIWAN SEMICONDUCTOR MANUFACTURING COMPANY LTD., Hsinchu (TW)

(72) Inventors: Chia-Chung Chen, Keelung (TW); Shufang Fu, Hsinchu County (TW); Kuan-Hung Liu, Hsinchu (TW); Chiao-Chun Hsu, Hsinchu (TW); Fu-Yu Shih, Hsinchu (TW); Chi-Feng Huang, Hsinchu County (TW); Chu Fu Chen, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 847 days.

(21) Appl. No.: 17/462,747

(22) Filed: Aug. 31, 2021

(65) Prior Publication Data
US 2023/0066030 A1    Mar. 2, 2023

(51) Int. Cl.
| G06F 30/398 | (2020.01) |
| H01L 29/66 | (2006.01) |
| G06F 119/02 | (2020.01) |
| G06F 119/18 | (2020.01) |

(52) U.S. Cl.
CPC ...... *G06F 30/398* (2020.01); *H01L 29/66462* (2013.01); *G06F 2119/02* (2020.01); *G06F 2119/18* (2020.01)

(58) Field of Classification Search
CPC .................................................. G06F 30/398
USPC .......................................................... 716/51
See application file for complete search history.

(56) References Cited

U.S. PATENT DOCUMENTS

| 7,112,826 B2 | 9/2006 | Motoki et al. |
| 7,968,391 B1 | 6/2011 | Smart et al. |
| 9,660,064 B2 | 5/2017 | Dasgupta et al. |
| 2007/0288219 A1* | 12/2007 | Zafar ............... G06T 7/0008 703/14 |

FOREIGN PATENT DOCUMENTS

KR     100810554     3/2008

* cited by examiner

*Primary Examiner* — Eric D Lee
(74) *Attorney, Agent, or Firm* — WPAT Law; Anthony King

(57) ABSTRACT

A calibration method for emulating a Group III-V semiconductor device, a method for determining trap location within a Group III-V semiconductor device and method for manufacturing a Group III-V semiconductor device are provided. Actual tape-out is performed according to an actual process flow of the Group III-V semiconductor device for manufacturing the Group III-V semiconductor devices and PCM Group III-V semiconductor device. Actual electrical performances of the Group III-V semiconductor devices and the PCM Group III-V semiconductor device are obtained and the actual electrical performances of the Group III-V semiconductor devices and the PCM Group III-V semiconductor device are compared to determine locations where one or more traps appear.

20 Claims, 8 Drawing Sheets

CALIBRATION METHOD FOR EMULATING GROUP III-V SEMICONDUCTOR DEVICE AND METHOD FOR MANUFACTURING GROUP III-V SEMICONDUCTOR DEVICE

BACKGROUND

During the fabrication of Group III-V semiconductor devices, the differences between the layers of the device structures in their crystal lattices and other fabricating conditions may lead to the formation of traps within the devices and the degradation of electrical performances of the devices. Methods of predicting possible locations where traps are located within the Group III-V semiconductor devices by emulated group III-V semiconductor devices prior to the actual tape-out to evaluate their electrical performances are desired for process enhancement and cost reduction.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
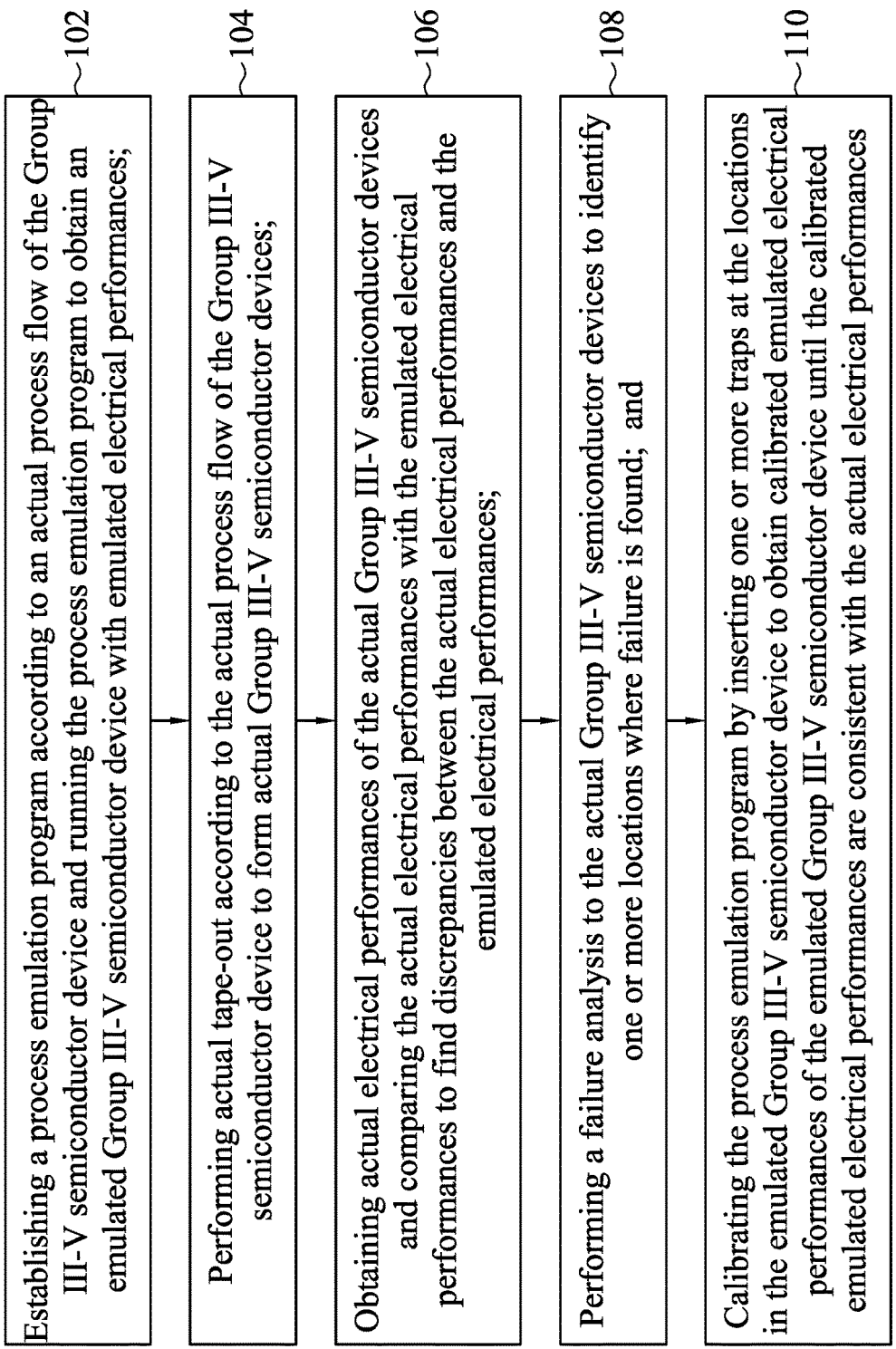
FIG. 1 illustrates a flowchart of a calibration method for emulating a Group III-V semiconductor device in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures.

The term "Group III-V semiconductor device" refers to a compound semiconductor device that includes at least one group III element and at least one group V element. Group III-V semiconductor devices may include one or more compounds of group III-V elements such as gallium nitride (GaN), gallium arsenide (GaAs), indium phosphide (InP), indium aluminum gallium nitride (InAlGaN), indium gallium nitride (InGaN) and the like. Group III-V semiconductor materials, such as GaN, enhances performance of electronic devices such as high electron mobility transistors (HEMTs). A GaN HEMT may comprise a Schottky layer of a material such as AlGaN, and a GaN buffer layer deposited on a substrate with source, gate, and drain regions formed on the Schottky layer. During operation of the GaN HEMT, a two-dimensional electron gas (2DEG) channel is formed between the Schottky layer and the GaN buffer layer, which is free to move in two dimensions, but tightly confined in the third dimension.

For Group III-V semiconductor layers, such as GaN layers, grown on blanket silicon substrates, challenges to be overcome include lattice mismatch and thermal mismatch between the GaN material and the Si material and the Schottky layer exposed to air during fabrication, which may lead to surface reactions such as oxidation occur on the surface of the Schottky layer. The aforementioned may all lead to the resulting defects such as traps within the device, which cause the electrical performances of the HEMTs degrade. However, such traps cannot be determined simply through electrical characterization as the electrical performance only reflect the overall performance of the resulting device, rather than the robustness of the device at different fabrication stages. Therefore, other measures need to be taken to find the locations, the sizes and the concentrations of the traps and the effect of the traps to the characteristics of the final devices need to be determined for process flow improvement.

During the research and development of new process flow for the HEMTs, a great amount of cost is spent on the trial-production of HEMTs at experimental stage for physical and electrical characterization. To save cost, a process emulation program, such as technology computer-aided design (TCAD), is adopted for new process flow development.

TCAD is an electronic design automation that models semiconductor fabrication and semiconductor device operation. TCAD is an important component of design and virtual manufacturing of an integrated circuit (IC) device, which analyzes characteristics of the IC manufacturing process and IC devices. IC TCAD mainly includes process emulation and device emulation. The process emulation mainly makes use of process flow emulation and process parameter emulation to obtain a virtual device structure, impurity distribution, junction depth, square resistance, and so on. The device emulation is mainly emulation performed on the virtual device structure by using a physical model of the device and test conditions to obtain parameters and a device characteristic curve. The application of IC TCAD could shorten a development cycle of the IC process and the IC device, reduce trial-production cost, further acquire information which is hard to obtain through experiments, and deepen physical research on IC process and device.

At present, the simulation technology in which emulation is performed on the process and physical characteristics of the device by using a TCAD platform is widely applied in semiconductor manufacturing process and device design. However, with the continuous reduction of IC feature size, the IC manufacturing process and the device structure characteristics tend to be more and more complex. In an actual application of TCAD emulation, an emulation result is usually distorted resulting in deviation between simulation device structure and an actual structure and a great error in emulation electrical parameters. For example, in developing a process flow for the manufacturing of HEMTs, it is found that when the emulated process flow is applied for actual device production, issues such as drain current ("Id current") degradation and threshold voltage ("Vt") shift were found in the produced devices, which do not match TCAD's emulated results.

According to the actual silicon data of the Group III-V semiconductor devices, such as GaN devices, drain current shift and substrate current leakage uniformity issues are found. After product failure analysis performed to the Group III-V semiconductor devices, it is found that the failed devices have defects found at several positions, such as, but not limited to, positions near the gate region, under the gate field plate, and in the bulk GaN epi-layer. After matching with TCAD emulated device operation conditions, it is further found that the positions where defects occurred correspond to those with high electric fields ("hot spot"). It is assumed that traps may be generated at the positions with high electric field, such as the position over the 2-DEG channel, near the dielectric layer, are of acceptor type, which cause the Id current degradation from about 5% to about 15% because in the high electric fields, electron-hole pairs in a semiconductor are often generated by impact ionization, which may cause high temperature operating line (HTOL) issue, which lead to the generation of charged traps in the devices. It is further found that the traps found located at the interface between the gate region and its underlying layer cause the Id current and threshold voltage degradation, and even lead to the failure of the GaN devices. In addition, it is found that the position, size, type and concentration of the traps are factors that affect the overall device performance.

Refer to FIG. 1. FIG. 1 illustrates a flowchart of a calibration method for emulating a Group III-V semiconductor device in accordance with some embodiments of the present disclosure. The method 100 begins with operation 102 in which a process emulation program is established according to an actual process flow of a Group III-V semiconductor device and the process emulation program is run to obtain an emulated Group III-V semiconductor device with emulated electrical performances. In some embodiments, the process emulation program may be a technology computer aided design (TCAD) process emulation program. In some embodiments, the Group III-V semiconductor device may include gallium nitride (GaN) device, gallium arsenide (GaAs) device, indium phosphide (InP) device, indium aluminum gallium nitride (InAlGaN) device, indium gallium nitride (InGaN) device, or a combination thereof. In some embodiments, the emulated electrical performances may include, but not limited to, emulated current-voltage (I-V) characterization such as drain current (Id) as a function of gate voltage (Vg), substrate current (Isub) as a function of source voltage (Vs), and saturation current (Isat) as a function of gate-to-source voltage (Vgs) characterization. In some embodiments, the GaN device includes a GaN layer over a substrate, an AlGaN layer over the GaN layer, a dielectric layer over the AlGaN layer, a gate region, a drain region, and a gate field plate.

The method 100 proceeds with operation 104 in which an actual tape-out is performed according to the actual process flow of the Group III-V semiconductor device for forming actual Group III-V semiconductor devices. In some embodiments, the actual tape-out may be carried out on substrates such as silicon wafers. The method 100 proceeds with operation 106 in which actual electrical performances of the actual Group III-V semiconductor devices are obtained, and the actual electrical performances are compared with the emulated electrical performances to find discrepancies between the actual electrical performances and the emulated electrical performances. In some embodiments, the actual electrical performances may include, but not limited to, current-voltage (I-V) characterization such as drain current versus gate voltage (Vg) characterization, substrate current (Isub) versus source voltage (Vs) characterization, and saturation current versus gate-to-source voltage characterization.

The method 100 proceeds with operation 108 in which a failure analysis is performed to the actual Group III-V semiconductor devices to identify one or more locations where failure is found. In some embodiments, the failure analysis may include, but not limited to, physical failure analysis. The physical failure analysis may include cross-section and planar transmission electron microscopy (TEM), staining with TEM/scanning electron microscopy (SEM), atom probe tomography (APT), conductive atomic force microscopy (C-AFM), and SEM-based nano-probing. Failure analysis is conducted on failed Group III-V semiconductor devices, determined according to their electrical performances, to identify the failure location ("hot spot"). In some embodiments, further physical and/or chemical analysis is conducted to determine the cause of failure. In some embodiments, after performing failure analysis to the failed Group III-V semiconductor devices, it may be found that the failure locations correspond to the regions in the emulated Group III-V device with locally maximum electric field, i.e., regions with electric field higher than that of the nearby regions in the device according to the emulated electrical performances of the emulated Group III-V semiconductor device.

The method 100 proceeds with operation 110, in which the process emulation program is calibrated by inserting one or more traps at the locations in the emulated Group III-V semiconductor device to obtain calibrated emulated electrical performances of the emulated Group III-V semiconductor device until the calibrated emulated electrical performances are consistent with the actual electrical performances. In some embodiments, the overall electrical performances of the actual Group III-V semiconductor device are contributed by a plurality of traps at multiple locations within the Group III-V semiconductor devices. In some embodiments, to evaluate the effect of each of the plurality of traps on the Group III-V semiconductor devices at different possible locations for calibrating the process emulation program, the traps at different locations are inserted to the emulated Group III-V semiconductor device one by one during the step of calibrating the process emulation program.

Figure 2:
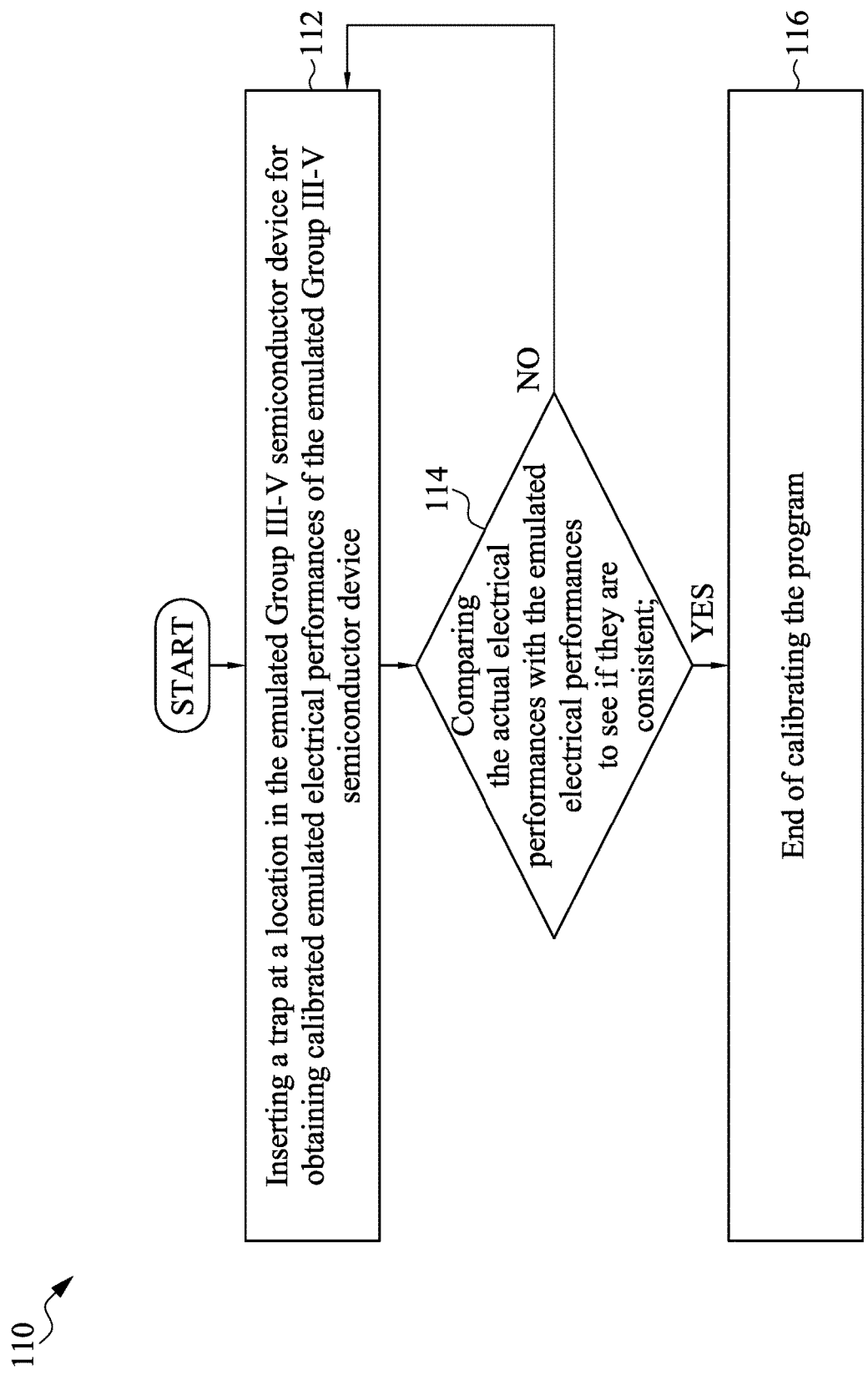
FIG. 2 illustrates a flowchart of the step of calibrating the process emulation program according to the calibration method in accordance with some embodiments of the present disclosure.

Refer to FIG. 2. FIG. 2 illustrates a flowchart of the step of calibrating the process emulation program according to the calibration method in accordance with some embodiments of the present disclosure. After the failure locations are identified, one or more traps are added to the emulated Group III-V semiconductor device for obtaining calibrated emulated electrical performances of the emulated Group III-V semiconductor device. In some embodiments, to evaluate the effect of each of the plurality of traps on the Group III-V semiconductor devices at different possible locations for calibrating the process emulation program, the traps at different locations are inserted to the emulated Group III-V semiconductor device one by one. The step of calibrating the process emulation program 110 begins with operation 112 in which a trap is inserted at a location in the emulated Group III-V semiconductor device to obtain calibrated emulated electrical performance of the emulated Group III-V semiconductor device. In some embodiments, for example, a trap may be inserted, but not limited to, at an interface between the gate region and its underlying layer; in the semiconductor body, or at an interface between the gate field plate and its underlying layer of the emulated Group III-V semiconductor device. The step of calibrating the process emulation program proceeds with operation 114 in which the actual electrical performances with the emulated electrical performances to see if they are consistent. In some embodiments, if the emulated electrical performances and the actual electrical performances are consistent, the calibration step 110 is ended. However, if the emulated electrical performances and the actual electrical performances are inconsistent, the step 110 proceeds back to operation 112 in which another trap is inserted at an another location within the emulated Group III-V semiconductor device to obtain calibrated emulated electrical performances of the emulated Group III-V semiconductor device. The step 110 then proceeds to operation 114 again in which the actual electrical performances with the emulated electrical performances to see if they are consistent. Operations 112 and 114 are repeated until the emulated electrical performances and the actual electrical performances are consistent.

In some embodiments, prior to calibrating the process emulation program, the calibration method 100 may further include a step in which actual tape-out according to the actual process flow of the Group III-V semiconductor device is performed for manufacturing process control monitor (PCM) Group III-V semiconductor devices and actual electrical performances of the PCM Group III-V semiconductor devices are obtained. In some embodiments, the PCM Group III-V semiconductor devices may include, but not limited to, PCM gallium nitride (GaN) device, PCM gallium arsenide (GaAs) device, PCM indium phosphide (InP) device, PCM indium aluminum gallium nitride (InAlGaN) device, PCM indium gallium nitride (InGaN) device, or a combination thereof. In some embodiments, the PCM Group III-V semiconductor devices and the actual Group III-V semiconductor devices may be manufactured on the same substrate, such as a wafer, to monitor the process stability, evaluate the process margin, and determine the possible locations where the traps are located. In some embodiments, the PCM Group III-V semiconductor devices are PCM GaN devices.

Figure 3:
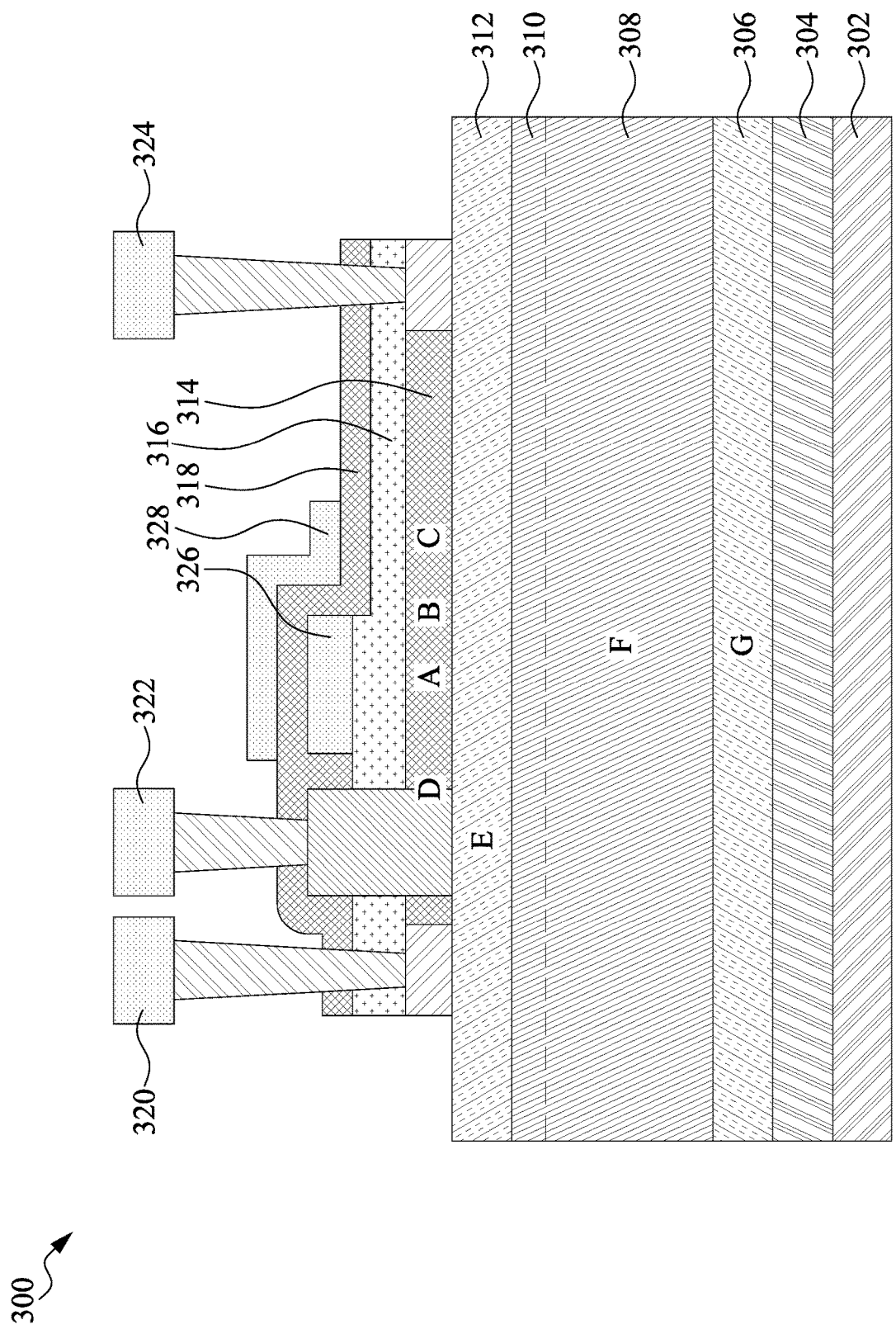
FIG. 3 illustrates a GaN device in accordance with some embodiments of the present disclosure.

In some embodiments, the GaN device may have a structure as shown in FIG. 3. FIG. 3 illustrates a GaN device in accordance with some embodiments of the present disclosure. In some embodiments, the GaN device 300 as shown in FIG. 3 includes a GaN layer 308 over a substrate 302, an AlGaN layer 312 over the GaN layer 308, a dielectric layer 314 over the AlGaN layer 312, a gate region 322, a drain region 324, a gate field plate 326, and at least one trap located at an interface between the AlGaN layer 312 and the dielectric layer 314. In some embodiments, the dielectric layer 314 may be formed of oxides such as silicon oxide, BPSG, USG, FSG, low-k dielectrics such as carbon doped oxides, extremely low-k dielectrics such as porous carbon doped silicon dioxide, a polymer such as polyimide, or a combination thereof.

Figure 4:
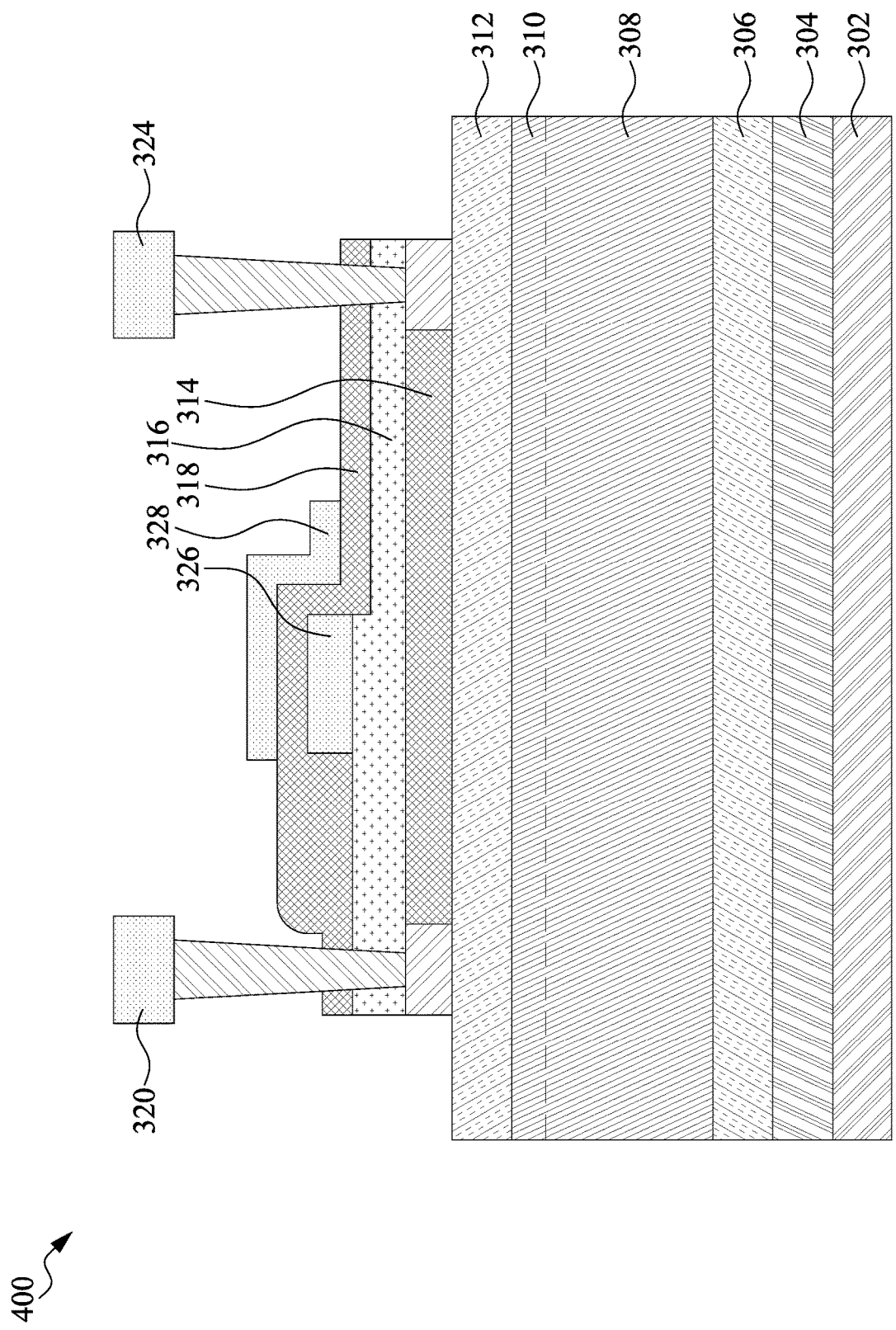
FIG. 4 illustrates a PCM GaN device in accordance with some embodiments of the present disclosure.

In some embodiments, the PCM GaN device may have a structure as shown in FIG. 4. FIG. 4 illustrates a PCM GaN device in accordance with some embodiments of the present disclosure. In some embodiments, the PCM GaN devices 400 as shown in FIG. 4 are manufactured according to the actual process flow except that a step of forming the gate region 322, as shown in FIG. 3, is omitted. The PCM GaN devices 400 without the gate region 322 may exclude the effect of the possible traps located at or near the gate region 322 in the PCM GaN device. Such PCM GaN devices 400 may be used together with the actual GaN device 300 to determine, for example, whether traps may exist in the GaN device at location(s) other than at or near the gate region 322, and evaluate the relationship between the 2DEG channel and the possible drain current shift.

Figure 5:
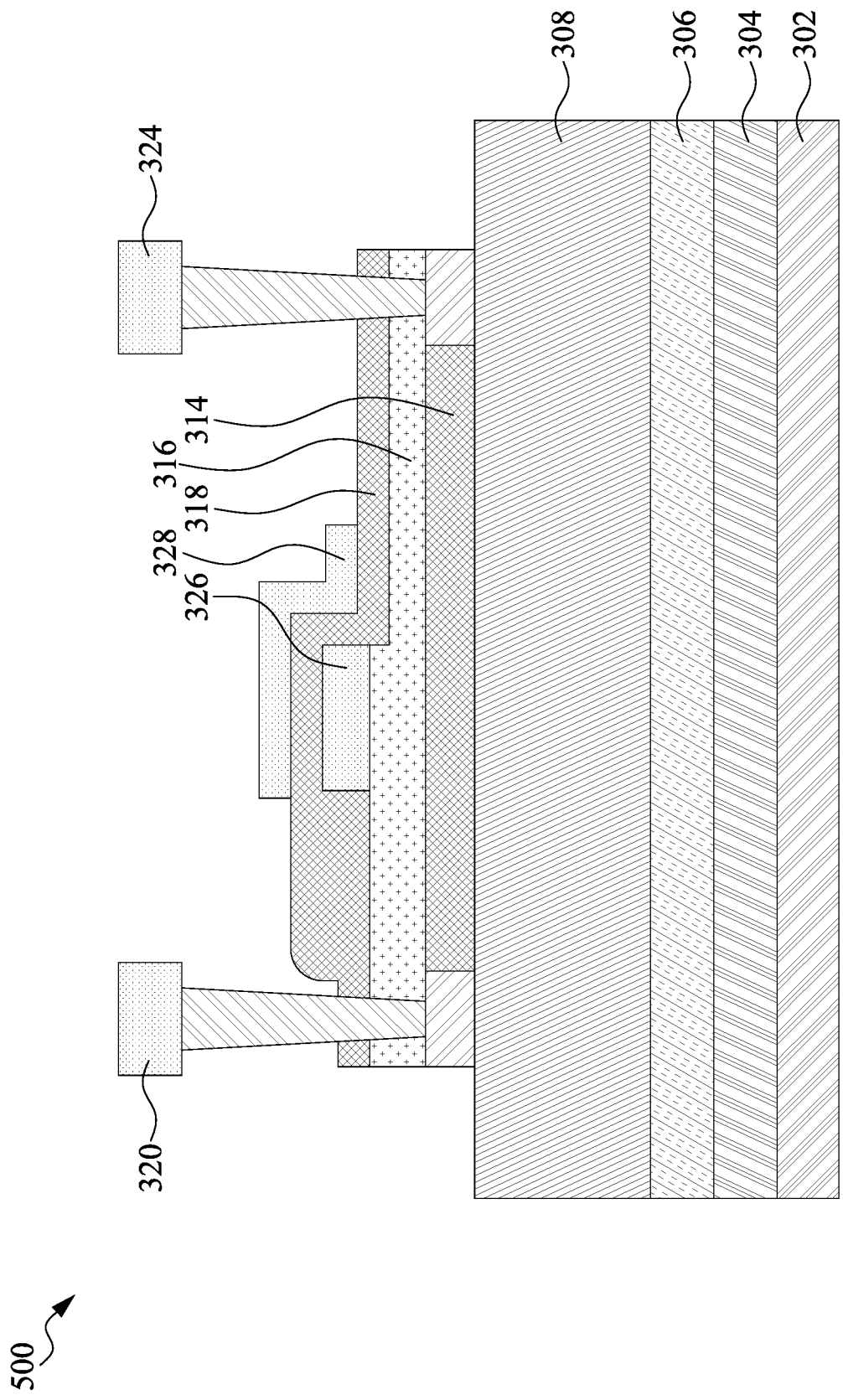
FIG. 5 illustrates a PCM GaN device in accordance with some embodiments of the present disclosure.

In some embodiments, the PCM GaN device may have a structure as shown in FIG. 5. FIG. 5 illustrates a PCM GaN device in accordance with some embodiments of the present disclosure. In some embodiments, the PCM GaN device 500 as shown in FIG. 5 are manufactured according to the actual process flow of the GaN device except for forming the gate region 322 and the AlGaN layer 312 as shown in FIG. 3. In this case, the PCM device can be used for determining, for example, whether a trap exists at location(s) near the substrate 302 by applying the source voltage and increase the source voltage to see if the substrate current significantly increases at certain source voltage, that is, when impact ionization occurs, and whether there is off-state leakage current caused by the substrate leakage current.

In some embodiments, when calibrating the process emulation program, a further implant dosage may be inserted at the gate region of the emulated Group III-V semiconductor device alone or in combination with the aforementioned insertion of traps within the emulated Group III-V semiconductor device to obtain calibrated emulated electrical performances of the emulated Group III-V semiconductor device until the calibrated emulated electrical performances are consistent with the actual electrical performances. In some embodiments, the emulated electrical performances may include, but not limited to, emulated current-voltage (I-V) characterization such as drain current (Id) as a function of gate voltage (Vg), substrate current (Isub) as a function of source voltage (Vs), and saturation current (Isat) as a function of gate-to-source voltage (Vgs) characterization. In some embodiments, the GaN device includes a GaN layer over a substrate, an AlGaN layer over the GaN layer, a dielectric layer over the AlGaN layer, a gate region, a drain region, and a gate field plate. In some embodiments, the implant dosage may include Mg dosage. In some embodiments, the implant dosage may have impact on the threshold voltage of the devices.

Figure 6:
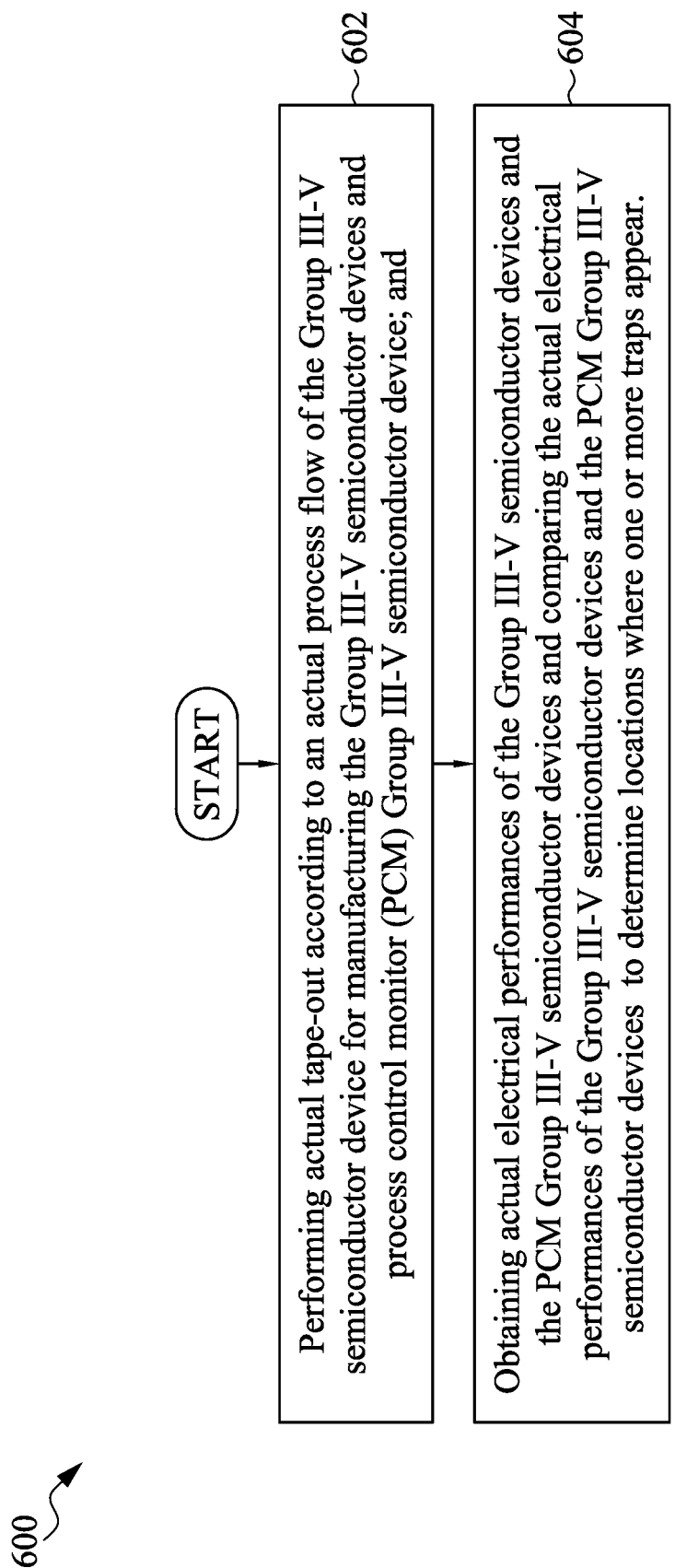
FIG. 6 illustrates a flowchart of a method for determining trap location within a Group III-V semiconductor device comprising in accordance with some embodiments of the present disclosure.

Refer to FIG. 6. FIG. 6 illustrates a flowchart of a method for determining trap location within a Group III-V semiconductor device comprising in accordance with some embodiments of the present disclosure. The method 600 begins with operation 602, in which actual tape-out is performed according to an actual process flow of the Group III-V semiconductor device for manufacturing the Group III-V semiconductor devices and PCM Group III-V semiconductor devices. The Group III-V semiconductor devices and PCM Group III-V semiconductor device may be manufactured in the same lot, for example. In some embodiments, the PCM Group III-V semiconductor devices may include, but not limited to, PCM gallium nitride (GaN) device, PCM gallium arsenide (GaAs) device, PCM indium phosphide (InP) device, PCM indium aluminum gallium nitride (InAlGaN) device, PCM indium gallium nitride (InGaN) device, or a combination thereof. In some embodiments, the PCM Group I-V semiconductor devices and the actual Group III-V semiconductor devices are manufactured on the same substrate, such as wafer, to monitor the process stability, evaluate the process margin, and determine the possible locations where the traps located. In some embodiments, the PCM Group III-V semiconductor devices are PCM GaN devices.

In some embodiments, the PCM GaN device are manufactured according to the actual process flow of the GaN device except that a step of forming the gate region and a step of forming the AlGaN layer are omitted. In this case, the PCM device can be used for determining, for example, whether a trap exists at location(s) near the substrate 302 by applying the source voltage and increase the source voltage to see if the substrate current significantly increases at certain source voltage, that is, when impact ionization occurs, and whether there is off-state leakage current caused by the substrate leakage current.

Figure 7A:
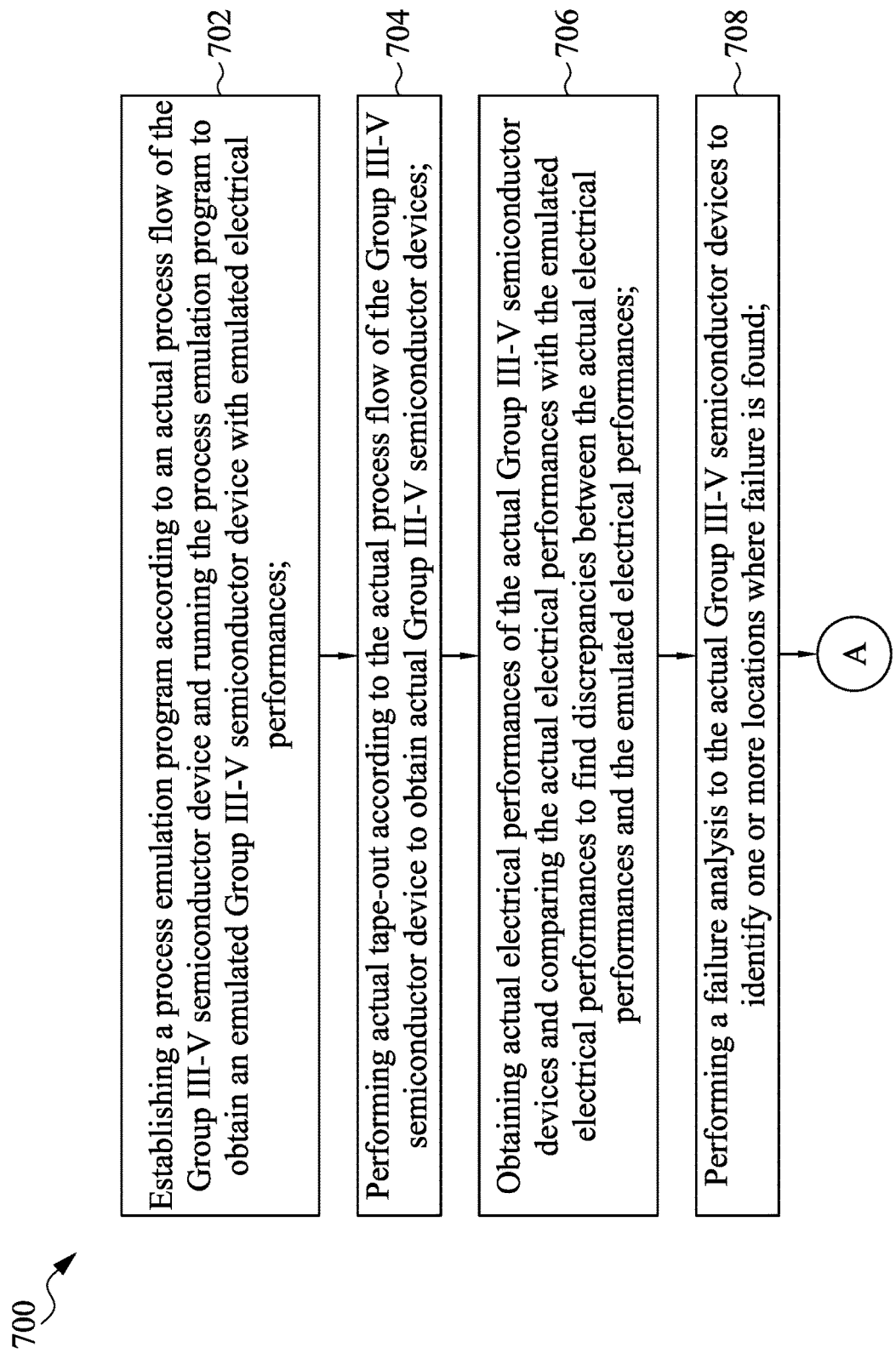
FIGS. 7A and 7B illustrate a flowchart of a method for manufacturing a Group III-V semiconductor device comprising in accordance with some embodiments of the present disclosure.
Figure 7B:
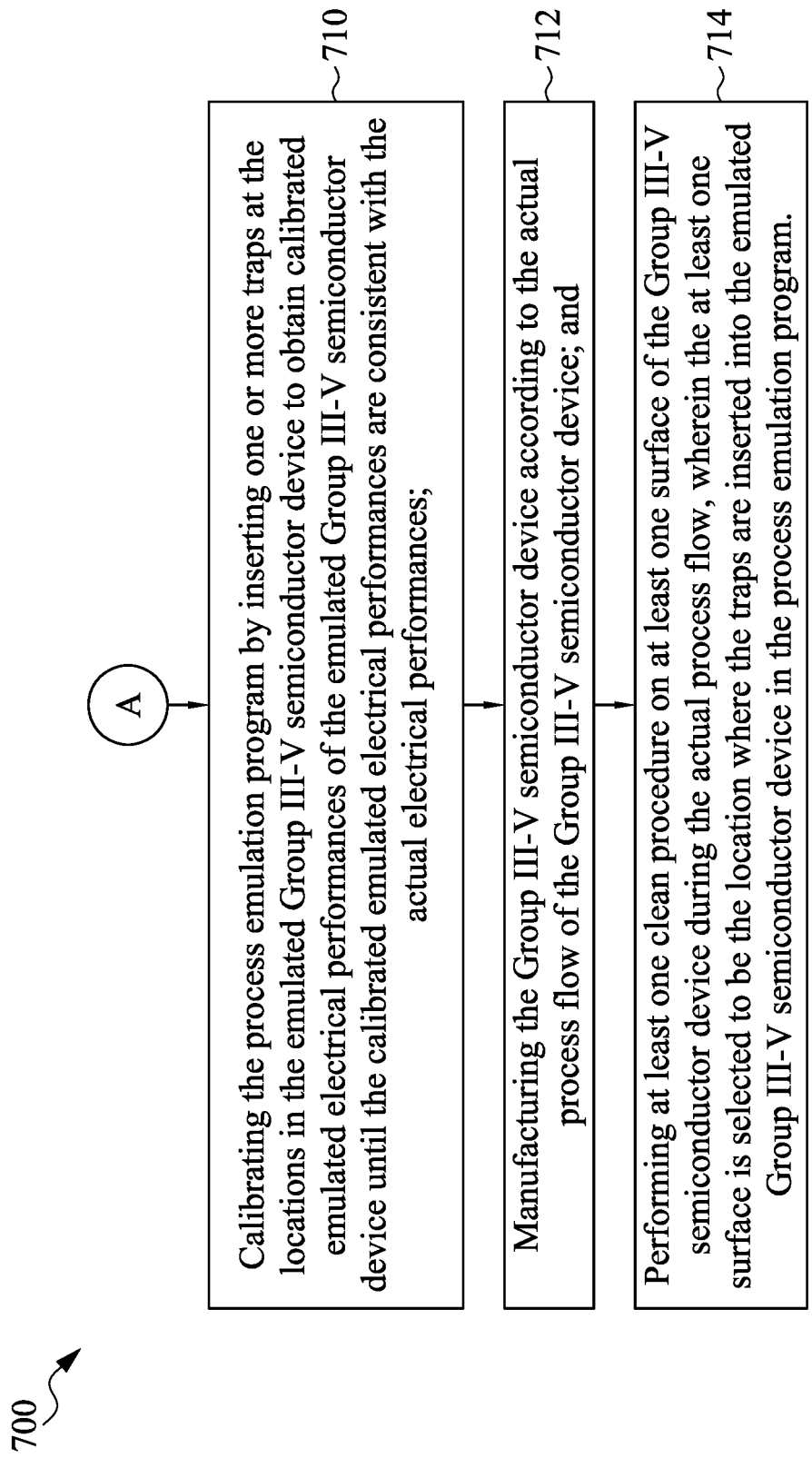

Refer to FIGS. 7A and 7B. FIGS. 7A and 7B illustrate a flowchart of a method for manufacturing a Group III-V semiconductor device comprising in accordance with some embodiments of the present disclosure. The method 700 begins with operation 702, in which a process emulation program is established according to an actual process flow of the Group III-V semiconductor device and the process emulation program is run to obtain an emulated Group III-V semiconductor device with emulated electrical performances. In some embodiments, the process emulation program may be a technology computer aided design (TCAD) process emulation program. The method 700 proceeds with operation 704, in which actual tape-out is performed according to the actual process flow of the Group III-V semiconductor device to form actual Group III-V semiconductor devices.

The method proceeds with operation 706, in which actual electrical performances of the actual Group III-V semiconductor devices are obtained and are compared with the emulated electrical performances to find discrepancies between the actual electrical performances and the emulated electrical performances. The method proceeds with operation 708, in which a failure analysis is performed to the actual Group III-V semiconductor devices to identify one or more locations where failure is found. The method proceeds with operation 710, in which the process emulation program is calibrated by inserting one or more traps at the locations in the emulated Group III-V semiconductor device to obtain calibrated emulated electrical performances of the emulated Group III-V semiconductor device until the calibrated emulated electrical performances are consistent with the actual electrical performances. The method proceeds with operation 712, in which the Group III-V semiconductor device is manufactured according to the actual process flow of the Group III-V semiconductor device.

The method 700 proceeds with operation 714, in which at least one clean procedure is performed on at least one surface of the Group III-V semiconductor device during the actual process flow, wherein the at least one surface is selected to be the location where the traps are inserted into the emulated Group III-V semiconductor device in the process emulation program. In some embodiments, prior to forming a subsequent layer on the Group III-V semiconductor device during the actual process flow for manufacturing the Group III-V semiconductor device, at least one exposed surface of the Group III-V semiconductor device is cleaned by a clean procedure. In some embodiments, the clean procedure may include a dry clean process, a wet clean process, or a combination thereof. The wet clean process removes material(s) from the surface of an integrated circuit structure, such as a Group III-V semiconductor device, via a solution, such as an aqueous solution, with reactants to react with the materials on the surface of the integrated circuit structure and bring the reacted material away with the solution. The dry clean process uses non-ionized gas at a temperature such as 100° C. or higher, to remove the material(s) from the surface of an integrated circuit structure.

Refer to FIG. 3 again. FIG. 3 illustrates a GaN device 300 in accordance with some embodiments of the present disclosure. In some embodiments, the GaN device 300 of the present disclosure may include a GaN layer 308 over a substrate 302, an AlGaN layer 312 over the GaN layer 308, a dielectric layer 314 over the AlGaN layer 312, a gate region 322, a drain region 324, a gate field plate 326, and at least one trap located at an interface between the AlGaN layer 312 and the dielectric layer 314. In some embodiments, the dielectric layer 314 may be formed of oxides such as silicon oxide, BPSG, USG, FSG, low-k dielectrics such as carbon doped oxides, extremely low-k dielectrics such as porous carbon doped silicon dioxide, a polymer such as polyimide, or a combination thereof. In some embodiments, the at least one trap includes a first trap A located below the gate field plate 326. In some embodiments, the at least one trap includes a second trap B located below an edge of the AlGaN layer 312 and between the first trap A and the drain region 324. In some embodiments, the at least one trap includes a third trap C located between the second trap B and the drain region 324.

In some embodiments, the GaN device 300 may further include a fourth trap D located between the dielectric layer 514 and the gate region 322. In some embodiments, the fourth trap D is located at an interface between the dielectric layer 314 and the gate region 322. In some embodiments, the GaN device 300 may further include a fifth trap E, wherein the fifth trap E is located between the gate region 322 and the AlGaN layer 312. In some embodiments, the fifth trap E is located at an interface between the gate region 322 and the AlGaN layer 312. In some embodiments, the GaN device 300 may further include a sixth trap F located in the GaN layer 308. In some embodiments, the GaN device 300 may further include a seventh trap G located between the GaN layer 308 and the substrate 302. In some embodiments, the GaN device 300 may further include a second AlGaN layer located between the GaN layer 308 and the substrate 302. In some embodiments, the GaN device 300 may further include an AlN layer 304 located between the second AlGaN layer 304 and the substrate 302. In some embodiments, the seventh trap G is located in the second AlGaN layer 306. In some embodiments, the substrate 302 may include a material such as silicon, sapphire, and silicon carbide.

In some embodiments, the trap may be an acceptor-type trap or a donor-type trap. In some embodiments, the GaN device 300 may further include an eighth trap at an interface between the AlN layer 304 and the substrate 302, wherein the eighth trap has a level of 0.1 eV to −0.1 eV from Ei, where Ei refers to the intrinsic Fermi level energy. In some embodiments, the eighth trap may have a concentration of from $5*10^{-12}$ to $5*10^{-14}$ $cm^2$. In some embodiments, the eighth trap may be an acceptor-type trap. In some embodiments, the GaN device may further include a ninth trap within the AlN layer 304. In some embodiments, the ninth trap may be an acceptor-type trap or a donor-type trap. In some embodiments, the ninth trap may be an acceptor-type trap having a trap level of 0.1 eV to 0.3 eV from Ec, where Ec refers to the energy of the conduction band minimum. In some embodiments, the ninth trap may be a donor-type trap having a trap level of 0.2 eV to 0.4 eV from Ev, where Ev refers to the energy of the valence band maximum. In some embodiments, the ninth trap may have a concentration of from $1*10^{-14}$ to $1*10^{-16}$ cm$^{-3}$. In some embodiments, the seventh trap G is an acceptor-type trap or a donor-type trap. In some embodiments, the seventh trap G may be an acceptor-type trap having a trap level of 0.1 eV to 0.3 eV from Ec. In some embodiments, the seventh trap G may be a donor-type trap having a trap level of 0.2 eV to 0.4 eV from Ev. In some embodiments, the seventh trap G may have a concentration of from $1*10^{-14}$ to $1*10^{-16}$ cm$^{-3}$. In some embodiments, the GaN device 300 may further include a tenth trap located at an interface between the second AlGaN layer 306 and the AlN layer 304. In some embodiments, the tenth trap may be a donor-type trap. In some embodiments, the tenth trap may have a trap level of 0.1 eV to –0.1 eV from Ei. In some embodiments, the tenth trap may have a concentration of from $3*10^{-12}$ to $3*10^{-14}$ cm$^2$.

By using the calibration method according to the present disclosure, a calibrated process emulation program for emulating a Group III-V semiconductor device, such as a high voltage 650V GaN device, with improved device characterization, is achieved. Such calibrated process program can be used for obtaining emulated Group III-V semiconductor device with emulated electrical performances consistent with those of the actual Group III-V semiconductor devices so as to save cost in actual tape-out of the Group III-V semiconductor device during the research and development of the process flow for manufacturing the Group III-V semiconductor devices.

In some embodiments, a calibration method for emulating a Group III-V semiconductor device is provided. A process emulation program is established according to an actual process flow of the Group III-V semiconductor device and the process emulation program is run to obtain an emulated Group III-V semiconductor device with emulated electrical performances. Actual tape-out is performed according to the actual process flow of the Group III-V semiconductor device to form actual Group III-V semiconductor devices. Actual electrical performances of the actual Group III-V semiconductor devices are obtained and are compared with the emulated electrical performances to find discrepancies between the actual electrical performances and the emulated electrical performances. A failure analysis is performed to the actual Group III-V semiconductor devices to identify one or more locations where failure is found. The process emulation program is calibrated by inserting one or more traps at the locations in the emulated Group III-V semiconductor device to obtain calibrated emulated electrical performances of the emulated Group III-V semiconductor device until the calibrated emulated electrical performances are consistent with the actual electrical performances.

In some embodiments, a method for determining trap location within a Group III-V semiconductor device is provided. Actual tape-out is performed according to an actual process flow of the Group III-V semiconductor device for manufacturing the Group III-V semiconductor devices and PCM Group III-V semiconductor device. Actual electrical performances of the Group III-V semiconductor devices and the PCM Group III-V semiconductor device are obtained and the actual electrical performances of the Group III-V semiconductor devices and the PCM Group III-V semiconductor device are compared to determine locations where one or more traps appear.

In some embodiments, a method for manufacturing a Group III-V semiconductor device is provided. A process emulation program is established according to an actual process flow of the Group III-V semiconductor device and the process emulation program is run to obtain an emulated Group III-V semiconductor device with emulated electrical performances. Actual tape-out is performed according to the actual process flow of the Group III-V semiconductor device to form actual Group III-V semiconductor devices. Actual electrical performances of the actual Group III-V semiconductor devices are obtained and are compared with the emulated electrical performances to find discrepancies between the actual electrical performances and the emulated electrical performances. A failure analysis is performed to the actual Group III-V semiconductor devices to identify one or more locations where failure is found. The process emulation program is calibrated by inserting one or more traps at the locations in the emulated Group III-V semiconductor device to obtain calibrated emulated electrical performances of the emulated Group III-V semiconductor device until the calibrated emulated electrical performances are consistent with the actual electrical performances. The Group III-V semiconductor device are manufactured according to the actual process flow of the Group III-V semiconductor device. At least one clean procedure is performed on at least one surface of the Group III-V semiconductor device during the actual process flow, wherein the at least one surface is selected to be the location where the traps are inserted into the emulated Group III-V semiconductor device in the process emulation program.

The foregoing outlines features of several embodiments so that those skilled in the art may better understand the aspects of the present disclosure. Those skilled in the art should appreciate that they may readily use the present disclosure as a basis for designing or modifying other operations and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:
1. A calibration method for emulating a Group III-V semiconductor device comprising:
establishing a process emulation program according to an actual process flow of the Group III-V semiconductor device and running the process emulation program to obtain an emulated Group III-V semiconductor device with emulated electrical performances;

performing actual tape-out according to the actual process flow of the Group III-V semiconductor device to form actual Group III-V semiconductor devices;

obtaining actual electrical performances of the actual Group III-V semiconductor devices and comparing the actual electrical performances with the emulated electrical performances to find discrepancies between the actual electrical performances and the emulated electrical performances;

performing a failure analysis to the actual Group III-V semiconductor devices to identify one or more locations where failure is found; and calibrating the process emulation program by inserting one or more traps at the locations in the emulated Group III-V semiconductor device to obtain calibrated emulated electrical performances of the emulated Group III-V semiconductor device until the calibrated emulated electrical performances are consistent with the actual electrical performances.

2. The calibration method of claim 1, wherein the Group III-V semiconductor device comprises a gallium nitride (GaN) device, gallium arsenide (GaAs) device, indium phosphide (InP) device, indium aluminum gallium nitride (InAlGaN) device, indium gallium nitride (InGaN) device, or a combination thereof.

3. The calibration method of claim 2, wherein the Group III-V semiconductor device is a GaN device.

4. The calibration method of claim 3, further comprising, prior to calibrating the process emulation program, performing actual tape-out according to the actual process flow of the GaN device for manufacturing process control monitor (PCM) GaN devices and obtaining actual electrical performances of the PCM GaN devices.

5. The calibration method of claim 3, wherein the GaN device comprises a GaN layer over a substrate, an AlGaN layer over the GaN layer, a dielectric layer over the AlGaN layer, a gate region, a drain region, and a gate field plate.

6. The calibration method of claim 5, wherein manufacturing the PCM GaN devices comprises performing the actual process flow of the GaN device except that a step of forming the gate region is omitted.

7. The calibration method of claim 5, wherein manufacturing the PCM GaN devices comprises performing the actual process flow of the GaN device except that a step of forming the gate region and a step of forming the AlGaN layer are omitted.

8. The calibration method of claim 5, further comprising calibrating the process emulation program by inserting implant dosage at the gate region of the emulated Group III-V semiconductor device to obtain calibrated emulated electrical performances of the emulated Group III-V semiconductor device until the calibrated emulated electrical performances are consistent with the actual electrical performances.

9. The calibration method of claim 1, wherein the electrical performances comprise the current-voltage characteristics of the emulated Group III-V semiconductor device and the actual Group III-V semiconductor devices.

10. The calibration method of claim 9, wherein the current-voltage characteristics comprise drain current as a function of gate voltage and substrate current as a function of source voltage.

11. A method for determining trap location within a Group III-V semiconductor device comprising:

performing actual tape-out according to an actual process flow of the Group III-V semiconductor device for manufacturing the Group III-V semiconductor device and a process control monitor (PCM) Group III-V semiconductor device; and obtaining actual electrical performances of the Group III-V semiconductor device and the PCM Group III-V semiconductor device and comparing the actual electrical performances of the Group III-V semiconductor device and the PCM Group III-V semiconductor device to determine locations where one or more traps appear.

12. The method of claim 11, wherein the Group III-V semiconductor device comprises a gallium nitride (GaN) device, gallium arsenide (GaAs) device, indium phosphide (InP) device, indium aluminum gallium nitride (InAlGaN) device, indium gallium nitride (InGaN) device, or a combination thereof.

13. The method of claim 12, wherein the Group III-V semiconductor device is a gallium nitride (GaN) device, and the PCM Group III-V semiconductor device is a PCM gallium nitride (GaN) device.

14. The method of claim 13, wherein the GaN device comprises a GaN layer over a substrate, an AlGaN layer over the GaN layer, a dielectric layer over the AlGaN layer, a gate region, a drain region, and a gate field plate.

15. The method of claim 13, wherein manufacturing the PCM GaN device comprises performing the actual process flow of the GaN device except that a step of forming the gate region is omitted.

16. The method of claim 13, wherein the PCM GaN device is manufactured according to the actual process flow of the GaN device except that a step of forming the gate region and a step of forming the AlGaN layer are omitted.

17. A method for manufacturing a Group III-V semiconductor device, comprising:

establishing a process emulation program according to an actual process flow of the Group III-V semiconductor device and running the process emulation program to obtain an emulated Group III-V semiconductor device with emulated electrical performances;

performing actual tape-out according to the actual process flow of the Group III-V semiconductor device to form actual Group III-V semiconductor devices;

obtaining actual electrical performances of the actual Group III-V semiconductor devices and comparing the actual electrical performances with the emulated electrical performances to find discrepancies between the actual electrical performances and the emulated electrical performances;

performing a failure analysis to the actual Group III-V semiconductor devices to identify one or more locations where failure is found;

calibrating the process emulation program by inserting one or more traps at the locations in the emulated Group III-V semiconductor device to obtain calibrated emulated electrical performances of the emulated Group III-V semiconductor device until the calibrated emulated electrical performances are consistent with the actual electrical performances;

manufacturing the Group III-V semiconductor devices according to the actual process flow of the Group III-V semiconductor device; and performing at least one clean procedure on at least one surface of the Group III-V semiconductor devices during the actual process flow, wherein the at least one surface is selected to be the location where the traps are inserted into the emulated Group III-V semiconductor device in the process emulation program.

18. The method of claim 17, wherein the Group III-V semiconductor device comprises gallium nitride (GaN) device, gallium arsenide (GaAs) device, indium phosphide (InP) device, indium aluminum gallium nitride (InAlGaN) device, indium gallium nitride (InGaN) device, or a combination thereof.

19. The method of claim 17, wherein the clean procedure comprises a dry clean process, a wet clean process or a combination thereof.

20. The method of claim 17, wherein the process emulation program comprises a Technology Computer Aided Design (TCAD) process emulation program.

* * * * *